United States Patent
Sharan et al.

(10) Patent No.: US 7,781,697 B2
(45) Date of Patent: Aug. 24, 2010

(54) MICRO-DISPLAY AND METHODS

(75) Inventors: Alok Sharan, Corvallis, OR (US);
Linda D. Lyster, Corvallis, OR (US);
Quoc A. Huynh, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 705 days.

(21) Appl. No.: 11/400,992

(22) Filed: Apr. 10, 2006

(65) Prior Publication Data
US 2007/0236646 A1    Oct. 11, 2007

(51) Int. Cl.
*B23K 26/00*    (2006.01)

(52) U.S. Cl. .............................. 219/121.64; 219/121.66; 219/121.85

(58) Field of Classification Search ............ 219/121.64, 219/121.66, 121.85; 438/795, 798
See application file for complete search history.

(56) References Cited

U.S. PATENT DOCUMENTS

| | | | |
|---|---|---|---|
| 5,399,805 A * | 3/1995 | Tyler et al. .................. 174/529 |
| 6,179,679 B1 * | 1/2001 | von Gutfeld et al. .......... 445/25 |
| 6,284,087 B1 * | 9/2001 | von Gutfeld et al. ..... 156/275.5 |
| 6,485,599 B1 * | 11/2002 | Glownia et al. .......... 156/272.8 |
| 6,741,302 B2 * | 5/2004 | von Gutfeld et al. .......... 349/64 |
| 6,775,958 B2 * | 8/2004 | Amako et al. ................. 53/478 |
| 6,811,916 B2 | 11/2004 | Mallari et al. |
| 6,939,778 B2 | 9/2005 | Harpster et al. |
| 6,979,597 B2 * | 12/2005 | Geefay et al. ............... 438/118 |
| 7,109,066 B2 * | 9/2006 | Yang ........................... 438/125 |
| 7,123,216 B1 * | 10/2006 | Miles .......................... 345/54 |
| 7,180,566 B2 * | 2/2007 | Lee ............................. 349/154 |
| 7,259,106 B2 * | 8/2007 | Jain ............................ 438/737 |
| 7,320,899 B2 * | 1/2008 | Haluzak et al. ............... 438/31 |
| 2002/0172451 A1 | 11/2002 | Gupta et al. |
| 2002/0176651 A1 | 11/2002 | Scott et al. |
| 2002/0176657 A1 | 11/2002 | Burke et al. |
| 2002/0179921 A1 | 12/2002 | Cohn |
| 2004/0067604 A1 | 4/2004 | Ouellet et al. |
| 2005/0012197 A1 | 1/2005 | Smith et al. |
| 2005/0139582 A1 * | 6/2005 | Tanaka .................. 219/121.75 |
| 2005/0184304 A1 | 8/2005 | Gupta et al. |
| 2005/0194677 A1 | 9/2005 | Heschel et al. |
| 2005/0232547 A1 | 10/2005 | Boudreau et al. |
| 2005/0275072 A1 | 12/2005 | Haluzak et al. |
| 2006/0076634 A1 * | 4/2006 | Palmateer et al. ........... 257/415 |
| 2006/0082737 A1 * | 4/2006 | Sterner et al. ............... 353/102 |

OTHER PUBLICATIONS

U.S. Appl. No. 10/971,637, John Sterner et al.

* cited by examiner

*Primary Examiner*—M. Alexander Elve

(57) ABSTRACT

A method of forming one or more micro-displays includes forming a first portion of a seal ring overlying a device substrate and surrounding one or more device chips formed on the device substrate, forming a second portion of the seal ring overlying a transparent cover, forming a first layer overlying the transparent cover, plasma bonding the first layer to a second layer formed overlying the device substrate and the one or more device chips, and fusing the first and second portions of the seal ring together using a beam of electromagnetic radiation.

16 Claims, 4 Drawing Sheets

MICRO-DISPLAY AND METHODS

BACKGROUND

Digital projectors often include micro-displays that include arrays of pixels. Each pixel usually includes a micro-electromechanical system (MEMS) device, such as a micro-mirror, a liquid crystal on silicon (LCOS) device, an interference-based modulator, etc. A micro-display is used with a light source and projection lens of the digital projector. The micro-display receives light from the light source. When the pixels of the micro-display are ON, the pixels direct the light to the projection lens. When the pixels are OFF, they do not direct the light toward the light source, e.g., they may direct the light from the light source away from the projection lens, absorb the light, etc. The projection lens images and magnifies the micro-display.

The pixels of many micro-displays are formed on a semiconductor substrate using semiconductor-processing methods. A transparent, e.g., glass, cover is typically adhered to a layer, e.g., an oxide layer, formed on the substrate overlying the pixels for packaging, e.g., sealing and/or protecting, the pixels. However, the interface between the layer and the cover may have a substantially different index of refraction than either the layer or the cover, e.g., due to air gaps etc. This causes some of the light that reaches the cover to be reflected to the projection lens. This degrades the "Black/White Contrast ratio" that is often defined as the ratio of the light imaged by the projection lens when all of the pixels in the micro-display are ON to the light imaged by the projection lens when all of the pixels are OFF and is a measure of the blackness of the projector's black state. It is often difficult and costly to seal the pixels using the cover and to reduce reflections due to the interface between the layer and the cover.

DETAILED DESCRIPTION

In the following detailed description of the present embodiments, reference is made to the accompanying drawings that form a part hereof, and in which are shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
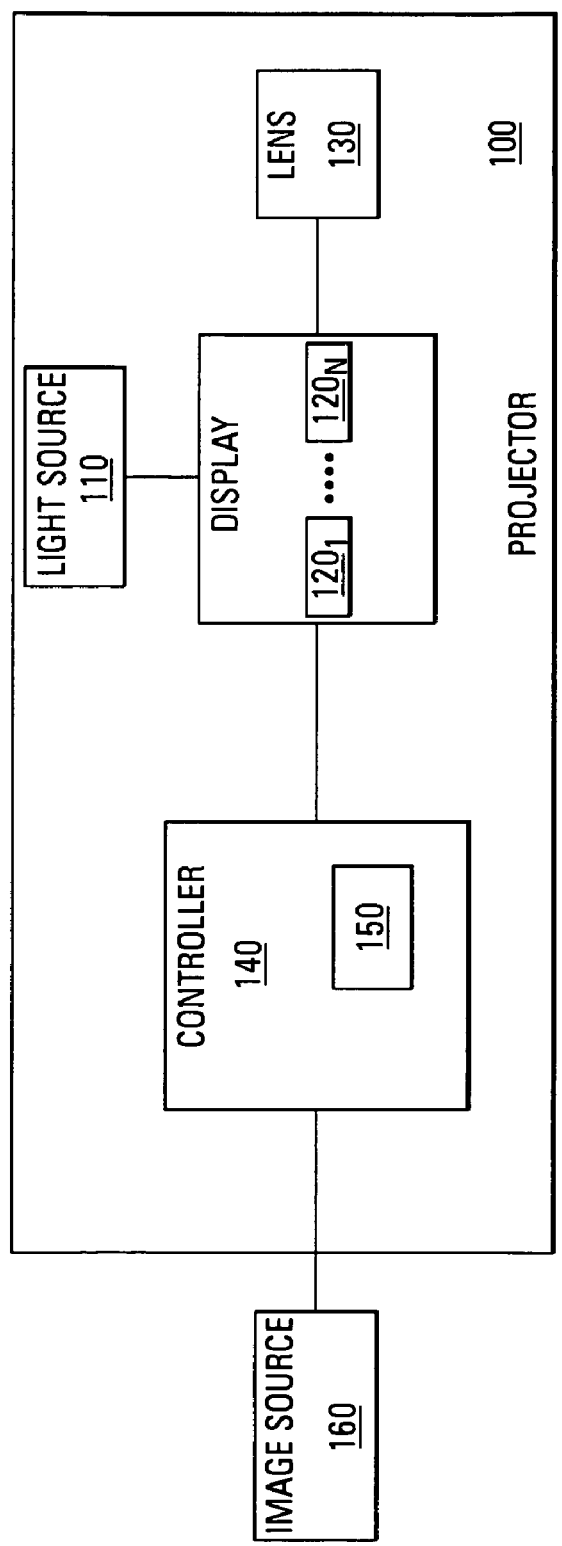
FIG. 1 is an embodiment of a projector, according to an embodiment of the invention.

FIG. 1 is a block diagram of a digital projector 100, such as is used in rear or front projection systems, according to an embodiment. Digital projector 100 includes a light source 110, micro-displays 120 optically coupled to light source 110, and a projection lens 130 optically coupled to micro-displays 120. For one embodiment, micro-displays 120 may include pixilated micro-electromechanical system (MEMS) devices, such as micro-mirrors, or interference-based modulators, LCD devices, such as Liquid Crystal on Silicon (LCOS) devices, etc. Micro-displays 120 are formed in accordance with embodiments of the present invention. Micro-displays 120 receive light from light source 110, and projection lens 130 magnifies micro-displays 120. Each of micro-displays 120 includes an array of pixels. When the pixels of a micro-display 120 are ON, the pixels direct the light to projection lens 130. When the pixels are OFF, they produce a "black" state.

Projector 100 also includes a controller 140 for controlling the operation of micro-displays 120. For one embodiment, controller 140 controls the modulation of micro-displays 120. Controller 140 receives digital source data, for example, from an image source 160, such as a computer, DVD player, a set-top box connected to a direct television satellite link, or a cable television provider, etc.

Figure 2:
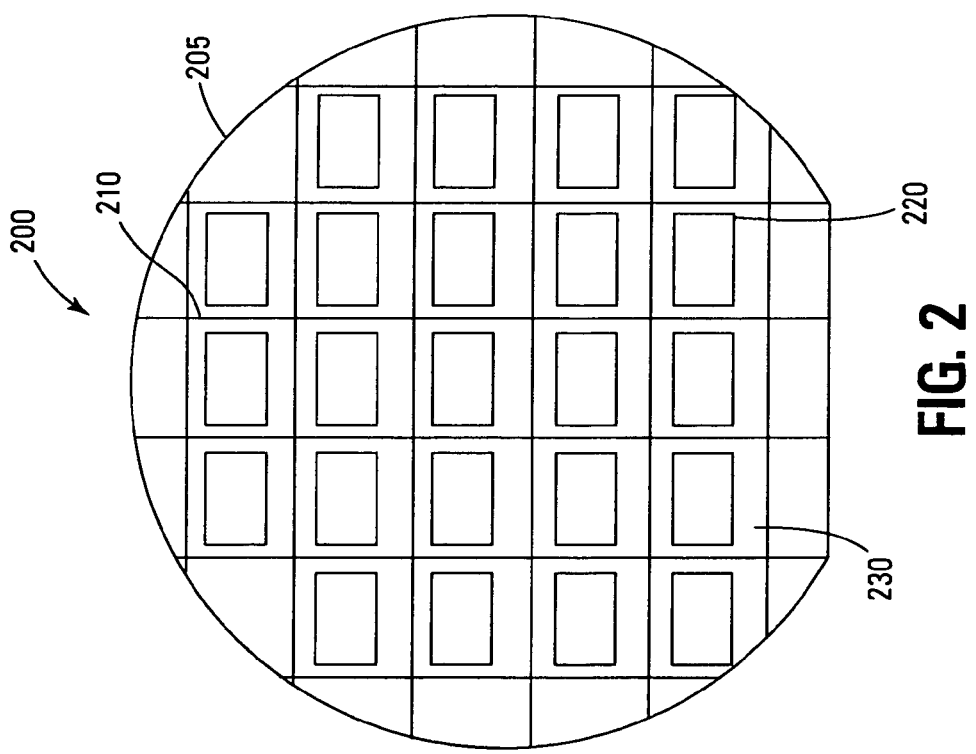
FIG. 2 illustrates an embodiment of a cover wafer, according to another embodiment of the invention.

FIG. 2 illustrates a cover wafer 200, according to another embodiment. Cover wafer 200 includes a cover substrate 205, e.g., of transparent glass. Metal lines 210 are formed overlying cover substrate 205 and form a portion of a bond (or seal) ring described below. Patches 220 are formed overlying cover substrate 205 and are contained within regions 230 defined by metal lines 210. That is, each patch 220 is surrounded by metal lines 210. For one embodiment, patches 220 are of a material that is ultra-violet-light-sensitive, that is transparent to visible light, that can be excited by plasma, such as oxygen plasma, and has an index of refraction that is substantially the same as cover substrate 205. For another embodiment, a treated polymer, e.g., treated polydimethylsiloxane (PDMS), is a suitable material for patches 220. Suitable treatments for PDMS include ethyl benzoin ether, isopropyl benzoin ether, dimethoxyphenylacetophenone, and diethoxyacetophenone. For another embodiment, metal lines 210 are of a eutectic alloy, such as gold and tin, e.g., about 80 percent gold and about 20 percent tin (with a melting temperature of about 280° C.), by weight, silver and tin, etc.

For one embodiment, cover 200 is formed by forming an adhesion layer, e.g. of titanium and tungsten, on cover substrate 205. Then, a metal layer is formed on the adhesion layer, and metal lines 210 are formed from the metal layer, e.g., using photolithographic techniques. Subsequently, a layer of the material of patches 220 is formed overlying cover wafer 200 and metal lines 210, e.g., using spin coating. For one embodiment, a mask layer is formed on the layer of the material of patches 220 and is patterned to define areas of the layer of the material of patches 220 for removal. Subsequently, for another embodiment, photolithography is used to remove the areas of the layer of the material of patches 220 defined for removal to expose metal lines 210 and portions of regions 230 located between patches 220 and lines 210.

Figure 3:
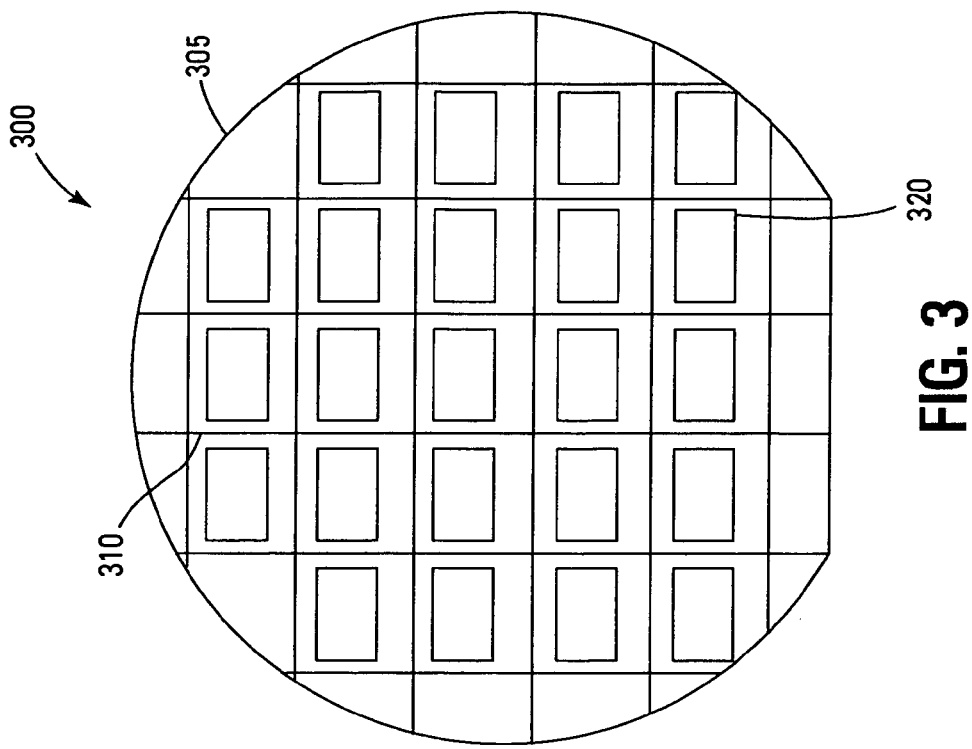
FIG. 3 illustrates an embodiment of a device wafer, according to another embodiment of the invention.

FIG. 3 illustrates a device wafer 300, according to another embodiment. For one embodiment, device wafer 300 includes a device substrate 305, e.g., of a semiconductor material, such as silicon, silicon oxide, etc. Metal lines 310 are formed overlying device substrate 305 and form another portion of the bond (or seal) ring described below. For one embodiment, metal lines 310 may be of the same material as metal lines 210 of FIG. 2, such as a eutectic material. Alternatively, metal lines 310 may be a metal, such as gold, formed on an adhesion material formed on device substrate 305. In another embodiment, metal lines 210 may be a metal, such as gold, formed on the adhesion material formed on cover substrate 205 (FIG. 2), and metal lines 310 (FIG. 3) may be of a eutectic material, such as described above in conjunction with FIG. 2. For another embodiment, metal lines 310 are formed by forming an adhesion layer, e.g. of titanium and tungsten, on device substrate 305. Then, a metal layer is formed on the adhesion layer, and metal lines 310 are formed from the metal layer, e.g., using photolithographic techniques, as described above for metal lines 210 of FIG. 2.

Device chips 320 are formed overlying device substrate 305 and are contained within regions 330 defined by metal lines 310. For one embodiment, device chips 320 may be pixilated MEMS devices, such as micro-mirrors, or interference-based modulators, LCD devices, such as Liquid Crystal on Silicon (LCOS) devices, etc.

Figure 4:
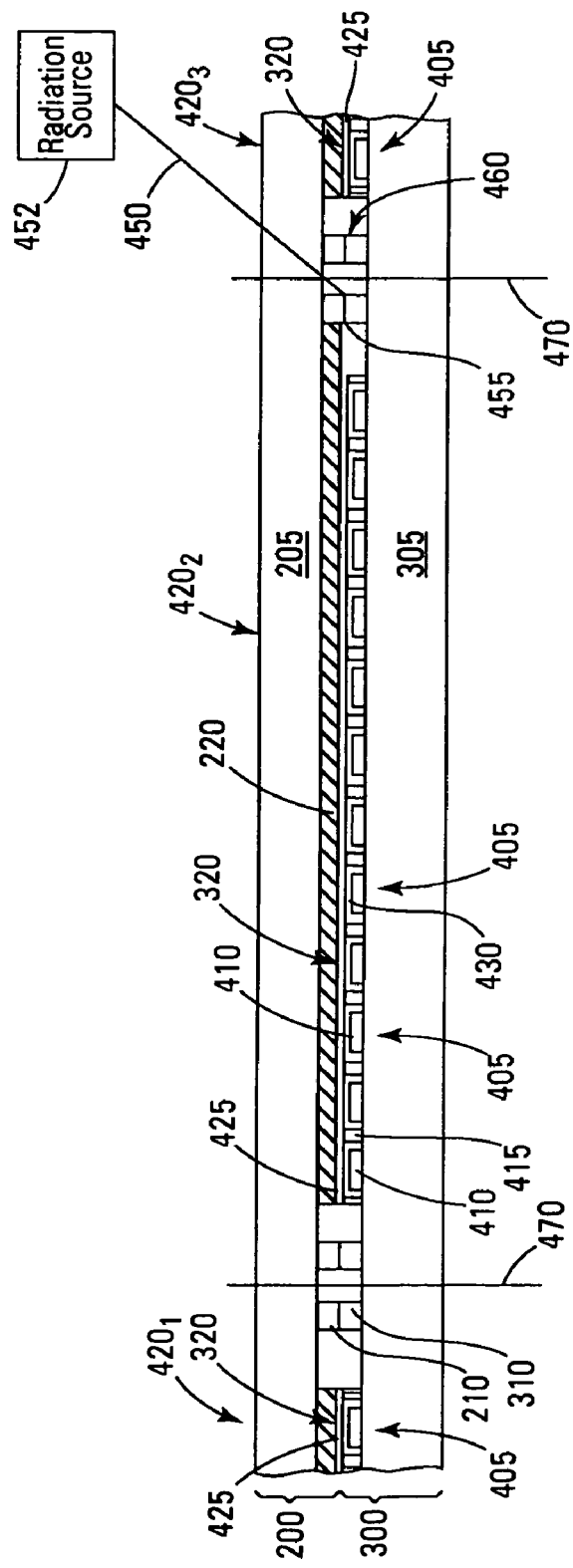
FIG. 4 illustrates portions of an embodiment of micro-displays, according to another embodiment of the invention.

FIG. 4 illustrates portions of micro-displays 4201-4203, e.g., as portions of micro-displays 120 of FIG. 1, according to another embodiment. The structure of FIG. 4 is formed by inverting cover wafer 200 (FIG. 2), aligning metal lines 210 of cover wafer 200 with metal lines 310 of device wafer 300 (FIG. 3), aligning patches 220 of cover wafer 200 with device chips 320 of device wafer 300, bonding patches 220 to device chips 320, and fusing metal lines 210 to metal lines 310.

For one embodiment, each device chip 320 of micro-displays 420 includes one or more pixels 405 formed on device substrate 305, as shown in FIG. 4. For another embodiment, pixels 405 form a portion of an array of pixels of each device chip 320. For some embodiments, each pixel 405 includes a MEMS device 410, such as a micro-mirror. For one embodiment, a plurality of posts 415, e.g., of a semiconductor material, such as silicon, silicon oxide, etc., is formed on device substrate 305, with one post 415 located between successive MEMS devices 410. A transparent layer 425, such as silicon oxide or the like, is formed overlying MEMS devices 410 and in contact with posts 415 so as to be supported thereby. Note that layer 425 is bonded directly to a patch 220. For one embodiment, layer 425, cover substrate 205, and the material of patches 220 have substantially the same indices of refraction.

For some embodiments, a gap 430, e.g., filled with a gas, such as air or an inert gas (argon, etc.) or that contains a vacuum, separates an upper surface of each MEMS device 410 from layer 425. For other embodiments, an optional partially-reflective layer (not shown), e.g., a tantalum aluminum (TaAl) layer, may be formed underlying and adjoining layer 425 so as to be located between MEMS devices 410 and layer 425. For one embodiment, MEMS devices 410 can move relative to the partially reflective layer for adjusting a size of gap 430. For this embodiment, display devices 420 operate as interference-based modulators.

Prior to bonding layers 425 of device chips 320 to the respectively corresponding patches 220 of cover 200, patches 220 are plasma activated, e.g., by exposing them to oxygen plasma. For one embodiment, the plasma-activated patches 220 are brought into contact with layers 425 of the respective device chips 420 substantially concurrently with abutting metal lines 210 with metal lines 310 (FIG. 4) and are subsequently bonded to layers 425. Activation of patches 220 enables them to covalently bond with layers 425 upon contact. This acts to reduce the likelihood of the formation of air gaps, for example, between cover 200 and layers 425, which when coupled with the fact that layer 425, cover substrate 205, and the material of patches 220 have substantially the same indices of refraction, acts to reduce reflections from cover 200.

After bonding layers 425 of device chips 320 to the respectively corresponding patches 220 of cover 200, a beam 450 of electromagnetic radiation, such as a beam of light, from a radiation source 452 is directed at an interface 455 between the abutted metal lines 210 and 310, as shown in FIG. 4. Beam 450 fuses metal lines 210 and 310 together to form a seal ring 460 that hermetically seals MEMS devices 410 within micro-displays 420. For one embodiment, radiation source 452 is a laser, such as an infrared laser, e.g., a $CO_2$ laser, a yttrium-aluminum-garnet (YAG) laser, etc., that may be operated in a continuous mode or a pulse mode. Therefore, beam 450 may a laser beam for this embodiment. Using a beam 450 produces localized heating that is substantially confined to the metal lines. This acts to reduce effects of global heating on MEMS devices 410 that may occur when using conventional heating methods, such as an oven. Such global heating effects can degrade the operating characteristics of MEMS devices 410, and thus of micro-displays 420, from expected characteristics. Moreover, global heating effects can act to degrade the bond between patches 220 and transparent layer 425. This may produce unwanted reflections from the interface between patches 220 and transparent layer 425 and thus from cover 200.

After fusing metal lines 210 to metal lines 310, display devices 420 are separated from each other, e.g., by sawing along lines 470, to produce a plurality of single display devices 420.

Figure 5:
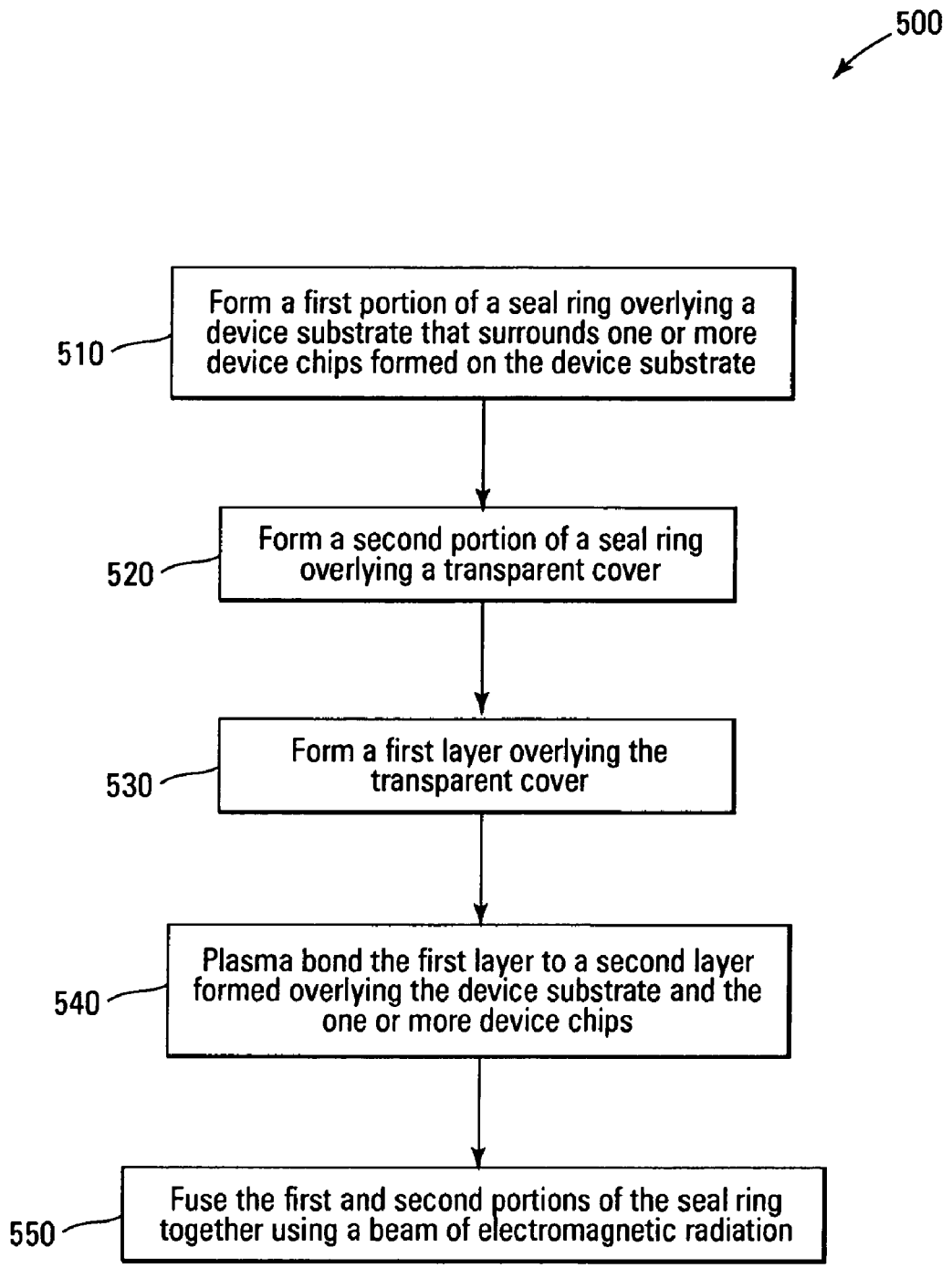
FIG. 5 is a flow chart of an embodiment of a method, according to another embodiment of the invention.

FIG. 5 is a flow chart of a method 500 for forming one or more micro-displays, according to another embodiment. At block 510, a first portion, such as formed by metal lines 310 of FIG. 3, of a seal ring, such as seal ring 460 of FIG. 4, is formed overlying a device substrate, such as device substrate 305 of FIG. 3, that surrounds one or more device chips, such as one or more device chips 320 of FIG. 3, formed on the substrate. A second portion, such as formed by metal lines 210 of FIG. 2, of the seal ring is overlying a transparent cover, such as cover 200 of FIG. 2, at block 520. More specifically, for one embodiment, metal lines 210 are formed on cover substrate 205, of FIG. 2.

At block 530, a first layer, such as one or more patches 220, is formed overlying the transparent cover, as described above in conjunction with FIG. 2. At block 540, the first layer is plasma bonded to a second layer, e.g., layer 425 of FIG. 4, formed overlying the device substrate and the one or more device chips. The first and second portions of the seal ring are fused together using a beam of electromagnetic radiation, such as described above in conjunction with FIG. 4.

Combining plasma bonding of the cover to the device chips with fusing the seal-ring portions of the cover to the seal-ring portions of device wafer using localized heating can result in display devices having reduced reflection and operating characteristics that are closer to expected characteristics than display devices formed using conventional fabrication techniques.

CONCLUSION

Although specific embodiments have been illustrated and described herein it is manifestly intended that the scope of the claimed subject matter be limited only by the following claims and equivalents thereof.

What is claimed is:

1. A method of forming one or more micro-displays, comprising:
    forming a first metal portion of a seal ring overlying and extending from a device substrate to define a region on the device substrate that contains one or more device chips formed on the device substrate;
    forming a layer within the region on the device substrate defined by the first metal portion of the seal ring so that the layer overlies the one or more device chips;

forming a second metal portion of the seal ring overlying and extending from a transparent cover to define a region on the transparent cover;

forming an ultra-violet-light-sensitive polymer on the transparent cover within the region on the transparent cover defined by the second metal portion of the seal ring so that the ultra-violet-light-sensitive polymer overlies the transparent cover;

plasma bonding the ultra-violet-light-sensitive polymer to the layer formed within region on the device substrate defined by the first metal portion of the seal ring by exposing the ultra-violet-light-sensitive polymer to plasma; and fusing the first and second metal portions of the seal ring together using a beam of electromagnetic radiation.

2. The method of claim 1, wherein the first and second portions of the seal ring are selected from the group consisting of a eutectic alloy, an alloy of gold and tin, and an alloy of silver and tin.

3. The method of claim 1, wherein plasma bonding the ultra-violet-light-sensitive polymer to the layer formed within region on the device substrate defined by the first metal portion of the seal ring covalently bonds the ultra-violet-light-sensitive polymer to that layer.

4. The method of claim 1, wherein the beam of electromagnetic radiation is selected from the group consisting of a laser beam, a laser beam produced by an infrared laser, a laser beam produced by a $CO_2$ laser, and a laser beam produced by a YAG laser.

5. The method of claim 1, wherein the transparent cover is of transparent glass.

6. The method of claim 1, wherein plasma bonding the ultra-violet-light-sensitive polymer to the layer formed within region on the device substrate defined by the first metal portion of the seal ring by exposing the ultra-violet-light-sensitive polymer to plasma comprises plasma activating the ultra-violet-light-sensitive polymer.

7. The method of claim 1, wherein indices of refraction of the cover, the ultra-violet-light-sensitive polymer, and the layer formed within region on the device substrate defined by the first metal portion of the seal ring are substantially the same.

8. The method of claim 1 further comprises forming an adhesion layer interposed between the cover and the second portion of the seal ring and an adhesion layer interposed between the device substrate and the first portion of the seal ring.

9. The method of claim 1, wherein forming the ultra-violet-light-sensitive polymer within the region on the transparent cover defined by the second metal portion of the seal ring so that the ultra-violet-light-sensitive polymer overlies the transparent cover further comprises:

forming a portion of the ultra-violet-light-sensitive polymer overlying the second portion of the seal ring; and removing the portion of the ultra-violet-light-sensitive polymer overlying the second portion of the seal ring from the second portion of the seal ring.

10. The method of claim 1, wherein forming the ultra-violet-light-sensitive polymer within the region on the transparent cover defined by the second metal portion of the seal ring so that the ultra-violet-light-sensitive polymer overlies the transparent cover, comprises spin coating the ultra-violet-light-sensitive polymer onto the transparent cover.

11. A method of forming a plurality of micro-displays substantially concurrently, comprising:

forming a plurality of first metal lines overlying a device substrate, the plurality of first metal lines defining a plurality of first regions on the device substrate, each of the first regions containing a device chip formed on the device substrate;

forming a layer within each of the first regions that overlies the device chip of that first region;

forming a plurality of second metal lines overlying a cover substrate, the plurality of second metal lines defining a plurality of second regions on the cover substrate;

forming a patch of ultra-violet-light-sensitive polymer within each of the second regions;

plasma activating each patch of ultra-violet-light-sensitive polymer;

respectively contacting the patches of plasma-activated ultra-violet-light-sensitive polymer with the layers respectively within the first regions of the device chip to covalently bond the patches of plasma-activated ultra-violet-light-sensitive polymer with the layers respectively within the first regions of the device chip;

abutting the first metal lines with the second metal lines substantially concurrently with contacting the patches of plasma-activated ultra-violet-light-sensitive polymer with the layers respectively within the first regions of the device chip; and directing a laser beam at the abutted first and second metal lines to fuse together the abutted first and second metal lines, thereby forming a seal ring around each of the device chips that hermetically seals the device chips, the seal ring around a device chip defining one of the plurality of micro-displays.

12. The method of claim 11, wherein indices of refraction of the cover substrate, the layers respectively within the first regions of the device chip, and the patches of ultra-violet-light-sensitive polymer are substantially the same.

13. The method of claim 11, wherein forming a patch of ultra-violet-light-sensitive polymer within each of the second regions, comprises:

forming a layer of ultra-violet-light-sensitive polymer overlying the plurality of second metal lines and the plurality of second regions on the cover substrate; and removing portions of the layer of ultra-violet-light-sensitive polymer to expose the plurality of second metal lines and a portion of each of the second regions on the cover substrate.

14. The method of claim 11, wherein the first and second metal lines are selected from the group consisting of a eutectic alloy, an alloy of gold and tin, and an alloy of silver and tin.

15. The method of claim 11, wherein the laser beam is selected from the group consisting of a laser beam produced by an infrared laser, a laser beam produced by a $CO_2$ laser, and a laser beam produced by a YAG laser.

16. The method of claim 11, wherein plasma activating each patch of ultra-violet-light-sensitive polymer comprises exposing each patch of ultra-violet-light-sensitive polymer to oxygen plasma.

* * * * *